Oct. 31, 1961   H. V. SHULER   3,006,106
BAIT CONTAINER
Filed May 27, 1959

INVENTOR

Harry V. Shuler

United States Patent Office 3,006,106
Patented Oct. 31, 1961

3,006,106
BAIT CONTAINER
Harry V. Shuler, P.O. Box 625, Ontario, Oreg.
Filed May 27, 1959, Ser. No. 816,088
3 Claims. (Cl. 43—55)

This invention relates to a singular worm bait container for fishermen.

It is the principal object of the present invention to provide a single worm bait container from which a worm can be taken without the fisherman having to touch the worm with the bare hand from the time the hook is applied to the worm within the container to the time when it is removed by the hook from the container.

It is another object of the invention to provide a container for receiving and storing the individual worm units wherein upon the units being placed in the container the opposite end of the container or reciprocal end can be opened and soil placed around the worm units and wherein this container is of a size adapted to be carried on the belt of the fisherman.

It is another object of the invention to provide a single worm bait container adapted to be disposed in a large container with soil therein in which the individual members are designed for easy insertion into the soil and from a common supporting plate accessible from one end of the carrying container and through which the worms can be easily and individually extended into the individual bait units.

It is a further object of the invention to provide a single worm bait container or unit that is formed of a hollow rubber tube in which there is provided a slit extending from the top of the tube to the bottom thereof with an enlarged hole thereat through which the fish hook can be extended and with receiving the worm take the hook and the worm upwardly through the tube and by flexing of the tube the hook and worm can be taken through the vertically-extending slit, the same being expanded sufficiently to permit the hook and worm to pass outwardly therefrom, and wherein the tube being flexible and of rubber will be provided with means by which the same can be extended into the soil within the main carrying container, such means in the form of a rod that is extended into the open upper end of the tube and against the closed end to force the tube into the soil.

Other objects of the invention are to provide a single worm bait container and a carrying case, having the above objects in mind, which is of simple construction, inexpensive to manufacture, has a minimum number of parts, easy to operate, light in weight, of pleasing appearance, efficient and effective in use.

Figure 1:
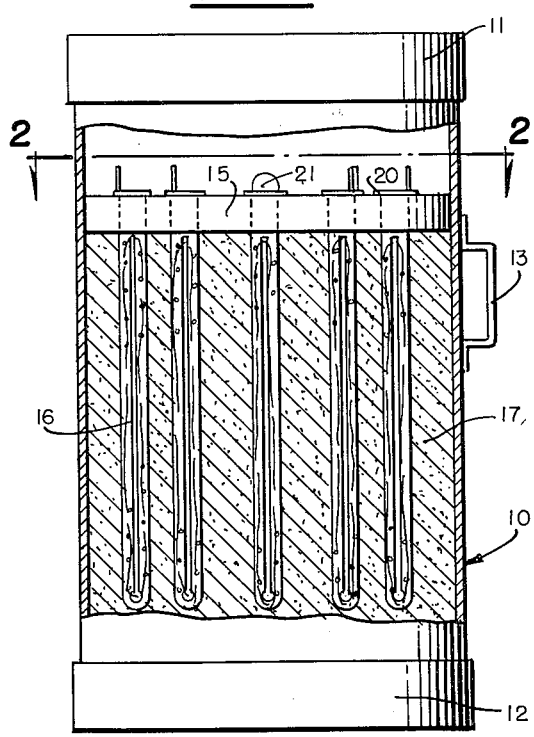
Figure 2:
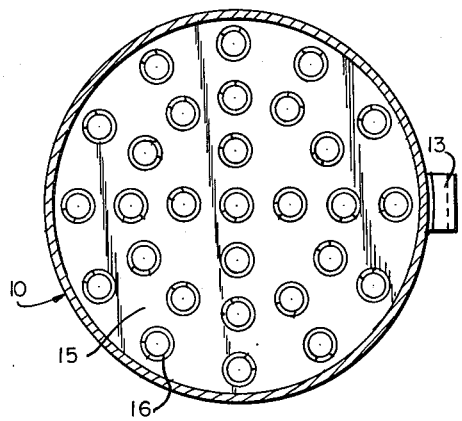
Figure 3:
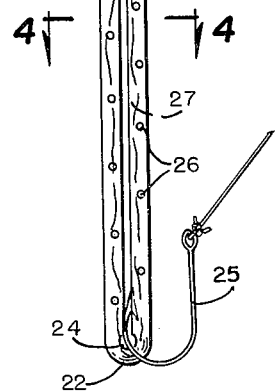
Figure 4:
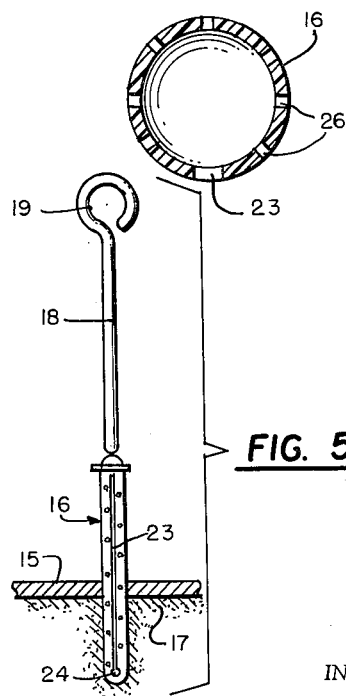
Figure 5:
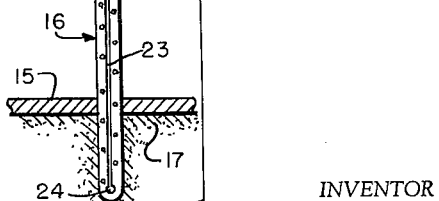

For a better understanding of the invention, reference may be had to the following detailed description taken in connection with the accompanying drawing, in which FIGURE 1 is an elevational view of the carrying case with the individual single worm bait containers arranged therein, FIG. 2 is a transverse sectional view of the container as viewed on line 2—2 of FIG 1 and looking in plan upon the open ends of the individual containers or units, FIG. 3 is an enlarged elevational view of the individual single bait worm container or unit, FIG. 4 is an enlarged transverse cross sectional view of the individual unit as viewed on line 4—4 of FIG. 3, and FIG. 5 is an illustrated view illustrating the manner in which the flexible or rubber hollow container is extended through the supporting plate and into the soil disposed thereunder and prior to the insertion of the worm thereinto.

Referring now to the figures, 10 represents an outside container or carrying case, open at both ends and provided with a cover 11 on the upper end and a cover 12 on the lower end. A loop 13 is secured to the side of the container through which a belt or strap can be passed to permit the case to be carried on the wearer.

A perforated supporting plate 15 is secured within the container 10 near to the top opening and under the cover 11 thereof but spaced therefrom. This perforated plate has a plurality of perforations or holes through which single worm bait containers 16 are extended to be surrounded in soil 17 that is disposed in the container 10 from the bottom end thereof upon removing the cover 11 and pouring the soil thereinto around and about the containers 16. In FIG. 5 these containers can be inserted and forced into the soil if the container has the soil already therein by a rod 18 having a handle 19 thereon. Each of these containers 16 are hollow and formed of rubber. A flange 20 is provided on the upper end to support the tubes on the perforated plate 15. A handle 21 extends upwardly from one side of the flange 20 which serves to pull the container or unit 16 from the perforated plate 15 and container or carrying case 10. This handle 21 is sufficiently rigid and strong so that the whole operation of removing the worm from the container can be effected.

The container 16 is closed at its lower end as shown at 22 and a long slit 23 extends upwardly from an enlarged hole 24 in the bottom of the container and through which a fish hook 25 is slid to pick up the worm. The end of the fish hook is first thrust through the enlarged hole 24 and then with the worm therein as indicated at 27 the pointed end of the hook will extend into the worm and as the hook is brought upwardly through the slot 23 a full connection is made with the worm and the same is placed well upon the hook 25. If it is desired to make certain that the worm is well upon the hook, the tube or container 16 can be squeezed to prevent the worm from moving upwardly or so that it can be held tightly without the fingers touching the same and the hook at the same time be worked upwardly through the worm. When the worm has been properly engaged and sufficiently so with the hook 25, the slot 23 will expand sufficiently to allow the hook and the worm to be taken outwardly from the container.

Preferably the container is perforated as indicated at 26 so as to allow the dirt to enter the end container and for the worm to have the feel of being within the soil. The worm when put into the container will tend to move downwardly toward the enlarged hole 24 to seek soil. With the worm removed the rod 18 can be put into the container 16 and the container forced downwardly again into the soil 17 and thereafter another worm is placed therewithin. Should the worm have become dead it can be readily determined as it will appear so in the container or unit.

It will be apparent that in this manner the worm can be kept in a fresh and healthy condition separated from themselves and from any dead worms that there may be. A supply of worms are always available in the container and the same can be carried by the carrying case on the fisherman's belt. It will be seen that through the perforations 26 of the container 16 that sufficient moisture is let into the container or unit 16 and along with it fine soil to give the worms a natural habitat.

Upon the cover 11 being removed, the tubes or individual containers 16 can be inserted through the holes in the plate 15 and supported therein from their flanges 20. The same amount of worms are disposed in the open ends of the tubes and the cover 11 is replaced. The bottom cover or lid 12 is removed and the container is filled from the bottom with soil which can be removed from time to time and also soil may be put in the top compartment above the flanges of the individual containers to hold the worms therewithin. While the case is being carried and the worms are being used this soil in the top of the container can be thrown away. By putting the worms in the top compartment, they will immediately go down into the tubes to get into the soil but they will be encased in the tubes. When the worm is desired, the individual tube is removed from the soil and while being merely held by the handle 21, a hook is extended through the hole 24 and moved upwardly through the worm and the hook and the worm is removed from the vertical slot 23 outwardly. The tube may thereafter be put back by pushing the same into the soil by the rod 18 or it may be left out until a refill is required.

While various changes may be made in the detailed construction, it shall be understood that such changes shall be within the spirit and scope of the present invention as defined by the appended claims.

What is claimed is:

1. A single worm bait container for fishermen comprising a hollow rubber tube closed at its lower end and terminating with a radially extending flange at its upper end, said tube having a longitudinal slit formed intermediate said ends and having a plurality of perforations formed along its length, said slit being normally closed and adapted to receive the pointed end of a fish hook which engages with a single worm bait contained in the tube such that on removing the hook from the tube the worm is removed through the slit which resiliently opens to permit passage of the hook and the worm.

2. A single worm bait container according to claim 1 wherein a hole is formed at one end of the slit adjacent the lower end of said tube to facilitate the insertion of the pointed end of the fish hook.

3. A single worm bait container according to claim 1 wherein said flange is adapted to support said tube within a perforated horizontally extending plate, and a handle portion connected to the flange and extending upwardly therefrom to enable the withdrawal of the tube from the plate and provide support therefor while the worm is being taken from the same.

References Cited in the file of this patent

UNITED STATES PATENTS

| | | |
|---|---|---|
| 1,474,891 | Burt | Nov. 20, 1923 |
| 2,768,736 | Govoni | Oct. 30, 1956 |
| 2,809,463 | Buss | Oct. 15, 1957 |
| 2,883,788 | Stitt | Apr. 28, 1959 |